(12) United States Patent
Sharad (10) Patent No.: US 11,341,277 B2
(45) Date of Patent: May 24, 2022

(54) METHOD AND SYSTEM FOR SECURING MACHINE LEARNING MODELS

(71) Applicant: NEC Laboratories Europe GmbH, Heidelberg (DE)

(72) Inventor: Kumar Sharad, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 614 days.

(21) Appl. No.: 15/997,880

(22) Filed: Jun. 5, 2018

(65) Prior Publication Data
US 2019/0325163 A1 Oct. 24, 2019

Related U.S. Application Data

(60) Provisional application No. 62/660,273, filed on Apr. 20, 2018.

(51) Int. Cl.
| | | |
|---|---|---|
| G06F 21/64 | (2013.01) | |
| G06F 21/82 | (2013.01) | |
| G06T 7/00 | (2017.01) | |
| G06N 20/00 | (2019.01) | |
| G06V 10/75 | (2022.01) | |

(52) U.S. Cl.
CPC ............ G06F 21/64 (2013.01); G06F 21/82 (2013.01); G06N 20/00 (2019.01); G06T 7/0002 (2013.01); G06V 10/757 (2022.01); G06T 2207/30168 (2013.01)

(58) Field of Classification Search
CPC .... G06F 2221/031; G06F 21/82; G06F 21/74; G06C 5/00; G06V 10/757; G06T 7/0002; G06T 2207/30168
See application file for complete search history.

(56) References Cited

U.S. PATENT DOCUMENTS

| | | | | |
|---|---|---|---|---|
| 8,891,878 B2* | 11/2014 | Rane | .................... | G06K 9/6239 |
| | | | | 382/190 |
| 10,542,034 B1* | 1/2020 | Shintre | .................... | G06N 3/08 |
| 2017/0256038 A1* | 9/2017 | Lee | ........................ | G06T 7/0012 |

OTHER PUBLICATIONS

Xu, et al., "Feature Squeezing: Detecting Adversarial Examples in Deep Neural Networks", Network and Distributed Systems Security Symposium (NDSS) 2018, pp. 1-15 (Year: 2018).*

(Continued)

*Primary Examiner* — Daniel B Potratz
(74) *Attorney, Agent, or Firm* — Leydig, Voit & Mayer, Ltd.

(57) ABSTRACT

A system for machine learning that is configured to receive an input having a plurality of features and predict one or more attributes of the input. The system includes a security mechanism, which determines an initial value for each of the features; determines a perturbation value for each of the features, the perturbation being randomly selected; adds the perturbation value to the initial value to determine a perturbed value for each of the features; and quantizes the perturbation value for each of the features to determine a quantized value for each of the features. The system also includes a classifier that receives the quantized value for each of the features and predict the one or more attributes of the input based on the quantized value for each of the features.

15 Claims, 5 Drawing Sheets

(56) References Cited

OTHER PUBLICATIONS

Weilin Xu, et al., "Feature Squeezing: Detecting Adversarial Examples in Deep Neural Networks", Network and Distributed Systems Security Symposium (NDSS) 2018, Feb. 18-21, 2018, pp. 1-15.
Nicolas Papernot, et al., "Distillation as a Defense to Adversarial Perturbations against Deep Neural Networks", $37^{th}$ IEEE Symposium on Security & Privacy, IEEE 2016, Mar. 14, 2016, pp. 1-16.
Nicholas Carlini, et al., "Towards Evaluating the Robustness of Neural Networks", arXiv:1608.04644v2, Mar. 22, 2017, pp. 1-19.
Dongyu Meng, et al., "MagNet: a Two-Pronged Defense against Adversarial Examples", arXiv:1705.09064v2, Sep. 11, 2017, pp. 1-13.

* cited by examiner

METHOD AND SYSTEM FOR SECURING MACHINE LEARNING MODELS

CROSS-REFERENCE TO PRIOR APPLICATION

Priority is claimed to U.S. Provisional Patent Application No. 62/660,273, filed on Apr. 20, 2018, the entire disclosure of which is hereby incorporated by reference herein.

FIELD

The present invention relates to protecting machine learning models from adversarial attacks.

BACKGROUND

Gradual improvement and evolution of machine learning has made it an integral part of many day-to-day systems. Indeed, machine learning as a service has become very popular in the recent years with many leading companies, including Google and Amazon, offering such services (including providing machine learning models and computer infrastructure). These services are often targeted towards small businesses that cannot afford to hire their own team for data science and invest in the compute infrastructure. For example, machine learning can be used as a vital part of systems in security related scenarios, which means the machine learning implemented systems are exposed to adversarial attacks.

Additionally, the rise of big data and readily available cheap computation power has fueled rapid advances in deep learning. However, deep learning has been found to be particularly vulnerable to adversarial perturbations due to over confidence of the predictions. Adversaries are often able to fool the machine learning models by carefully introducing perturbations to a valid data sample. The perturbations are chosen in such a way that they are large enough to change the original correct prediction of the model but small enough to go unnoticed. For instance, in the domain of hand-written digit recognition, this could mean modifying the image of digit 1 to change the model's correct prediction to another digit, while keeping the modified image visually indistinguishable from the original.

Protecting machine learning models from adversarial attacks has proven difficult. In particular, it is difficult to protect against perturbation attacks because mistakes will always exist in practical models due to the statistical nature of machine learning models. While several defenses against perturbation attacks have been proposed, the proposed defenses have drawbacks or have been already broken (see, e.g., Carlini and Wagner, "Towards evaluating the robustness of neural networks," 2017 IEEE Symposium on Security and Privacy, pp. 39-57 (2017), the entire contents of which are hereby incorporated by reference herein).

For example, some have proposed hiding model parameters to secure machine learning models (see, e.g., Papernot et. al, "Distillation as a defense to adversarial perturbations against deep neural networks," 2016 IEEE Symposium on Security and Privacy, pp. 582-597 (2016), the entire contents of which are hereby incorporated by reference herein), but hiding model parameters does not protect against the adversary training a substitute model and then transferring the attacks. Limiting feature space has also been proposed (see e.g., Xu et. al, "Feature squeezing: Detecting adversarial examples in deep neural networks," arXiv:1704.01155 (2017), the entire contents of which are hereby incorporated by reference herein), but limiting feature space techniques for images generally cannot be extended to other domains. Still further, others have attempted to secure machine learning models by providing responses to each query on the basis of training data in the vicinity of the query (see e.g., Meng and Chen, "Magnet: a two-pronged defense against adversarial examples," 2017 ACM SIGSAC Conference on Computer and Communications Security, pp. 135-147 (2017) ("Meng"), the entire contents of which are hereby incorporated by reference herein), but the limiting responses technique is not optimal in all scenarios.

SUMMARY

Embodiments of the present invention provide a system for machine learning that is configured to receive an input having a plurality of features and predict one or more attributes of the input. The system includes a security mechanism, which determines an initial value for each of the features; determines a perturbation value for each of the features, the perturbation being randomly selected; adds the perturbation value to the initial value to determine a perturbed value for each of the features; and quantizes the perturbation value for each of the features to determine a quantized value for each of the features. The system also includes a classifier that receives the quantized value for each of the features and predict the one or more attributes of the input based on the quantized value for each of the features.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide mechanisms to harden (secure) machine learning systems against targeted adversarial attacks. In embodiments, machine learning models are hardened by randomizing and quantizing inputs. Embodiments are able to defeat (protect against) state-of-the-art attacks on machine learning based image classification systems. Indeed, the inventor knows of no existing adversarial attack that can achieve significant success against the defenses provided by the present invention. Moreover, embodiments of the present invention are able to achieve this hardening at minimal cost to accuracy. Accordingly, the present invention provides a significant improvement over state-of-the-art security mechanisms of machine learning systems.

A threat model of embodiments considers a white-box attack scenario where an adversary has full knowledge of and access to a machine learning model. In this scenario, the adversary is free to learn from the model via unlimited query-response pairs. However, the adversary is not allowed to manipulate the model or the training process in any way (e.g. by poisoning the data used to train the model).

The adversary is free to introduce any perturbation to a valid data sample to produce a sample that fools the model's prediction. However, the adversary is practically constrained by the amount of perturbation that can be introduced to a valid sample (i.e., it should still be close to the valid data sample). This is because, while it is always possible for the adversary to introduce trivially huge perturbations to a valid sample to evoke a false response from the model, this is not considered an attack. In the realm of hand-written digit classification, an attack can be seen as modifying the image of a digit enough to get it classified incorrectly while keeping it visually similar to the original image. The difference in the images can be captured via some commonly used distance metrics such as: (1) number of pixels changed; (2) Euclidean distance between original and perturbed image calculated pixel-wise; or (3) maximum change introduced to any pixel (see e.g., Meng).

The threat model of embodiments captures this scenario, that is where the adversary is free to use the infrastructure but cannot manipulate it in anyway. However, if the model can be deceived, then the adversary could potentially use it to their advantage, especially in the case of security based applications. Thus, it important that security mechanisms for machine learning consider the robustness of models under duress (e.g., consider attack methodologies).

In essence, all attacks try to fool machine learning models by estimating the minute perturbations to be introduced that alter the model's predictions. White-box attacks achieve this by picking a valid input sample and iteratively querying the model with minor perturbations in each step, which are chosen based on the response of the classifier. Thus, the attacker tries to predict how the perturbations affect the classifier and then responds adaptively. As discussed, attackers are bound by the amount of input perturbation they are allowed to introduce. In the context of hand-written digit recognition, this can be achieved by reducing the requirements to an optimization algorithm (optimization problem), which tries to maximize the likelihood of inducing an error while minimizing the perturbation required. The optimization algorithm finally outputs a list of pixels and the perturbation to be introduced to cause a misclassification.

At times, machine learning models are challenging to attack due to deliberate numerical instabilities being introduced by the designer to dissuade attackers. In such a scenario, attackers can train a substitute model and develop adversarial samples for that. These samples can be transferred to attack the original model. Research has shown that such attacks often succeed with high probability, and thus introducing deliberate numerical instabilities has not amounted to an adequate defense. Indeed, it is difficult to have a successful deterministic defense against an adaptive attack strategy.

Embodiments of the present invention defend against an adaptive attack strategy by randomizing and quantizing the inputs before they are fed to the classifier (e.g., embodiments provide a defense via input randomization and feature quantization). Through techniques used by embodiments, both direct and transferability based attacks are defended against.

For example, an embodiment provides a security mechanism for protecting hand-written digit recognition that introduces perturbation chosen uniformly at random from a predefined distribution to the input (i.e., each perturbation level is equally likely to be selected and unpredictable). According to the methodology employed by embodiments, the security mechanism perturbs every input in a manner to which an adversary cannot adapt. Since, the perturbation is introduced uniformly at random at feature level for each feature component and within a predefined threshold; it does not bias the prediction excessively in any particular direction. Feature level perturbations changes the characteristics of the data point thus affecting the prediction of the learning model. The perturbation threshold is chosen empirically so that that prediction performance does not degrade substantially. For example, in an embodiment applied to grey scale images (where pixel values varies from [0,255]), a threshold allowing for perturbation in the range [−120,120] produced only a minor drop in accuracy; compared to allowing for a larger perturbation range [−200,200], which produced significant loss in accuracy.

In addition to the randomness described in the above example, embodiments' randomness can be added from a different distribution, such as Gaussian. In fact, many different implementations of randomness can be used as long as its introduction makes the perturbation unpredictable for the adversary. That is, embodiments of the present invention are not bound to only a specific kind of randomness.

Security mechanisms provided by embodiments also quantize the feature components. For example, some embodiments quantize the feature components by limiting the features to take only distinct values based on a quantization level). In an embodiment applied to grey scale images (where pixel values range from [0,255]) quantization levels of 25-150 are preferred. For example, if 100 is chosen as the quantization level then pixels of a grey scale image could only take values of 0, 100 and 200, and all pixels are rounded off to the closest level. Feature quantization constrains the adversary to a limited perturbation levels by disallowing the values between quantization levels. These defenses force the attacker to introduce perturbations that are large enough that they are not undone by (either or both) random perturbations added to each feature component and their subsequent quantization while still being close to the original sample. Thus, embodiments of the present invention have the advantage that they limit the attacker to only trivial attacks.

In an example embodiment, a perturbation uniformly at random is chosen from the discrete interval $(-\delta,+\delta)$ for each pixel, and then added to the value of each pixel to get a new value. This new value is assigned back to the particular pixel. Since a pixel can only take value in a particular range, e.g. [0,255], the sum is clipped if it goes outside these bounds. The pixel values are then quantized as follows: $[p/\kappa]\kappa$ where p is the value of the pixel after adding perturbation and $\kappa$ is the value of the quantization level. This forces each pixel value to change only in steps of $\kappa$ and reduces the attack surface of the adversary According to an embodiment of the invention, the discrete interval is chosen such that there is only less than 5% decrease in accuracy, preferably 1-2% decrease, and more preferably less than 1% decrease in accuracy. For example in a grey scale pixel (where boxes values can be in the range of [0,255], noise can perturb the pixel in the range of [0, 255] and as the noise increases the accuracy of the machine learning model decreases. Selecting the discrete interval to be (−120, 120), results in about 1-2% decrease in accuracy. This can be scaled up and down based on the needs of the defender, including adjusting for a feature that has a different allowable range of values (e.g., other than [0,255]).

The quantization value κ is configurable according to the needs of the defender. According to an embodiment in a system with grey scale pixels, κ is preferably within the range of 25-150. However, in other embodiments and systems, κ may be a different value. A benefit of using quantization values in embodiments is that the attack surface shrinks according to the quantization level (e.g., from 255 available values to only three (0, 100, 200) with a quantization value of 100).

The defense provided by embodiments of the present invention is independent of the machine learning model and acts as a protective layer between user input and the classifier. Thus, the defense can be modular. This modularity allows for plugging the defense layer into any machine learning model.

Figure 1:
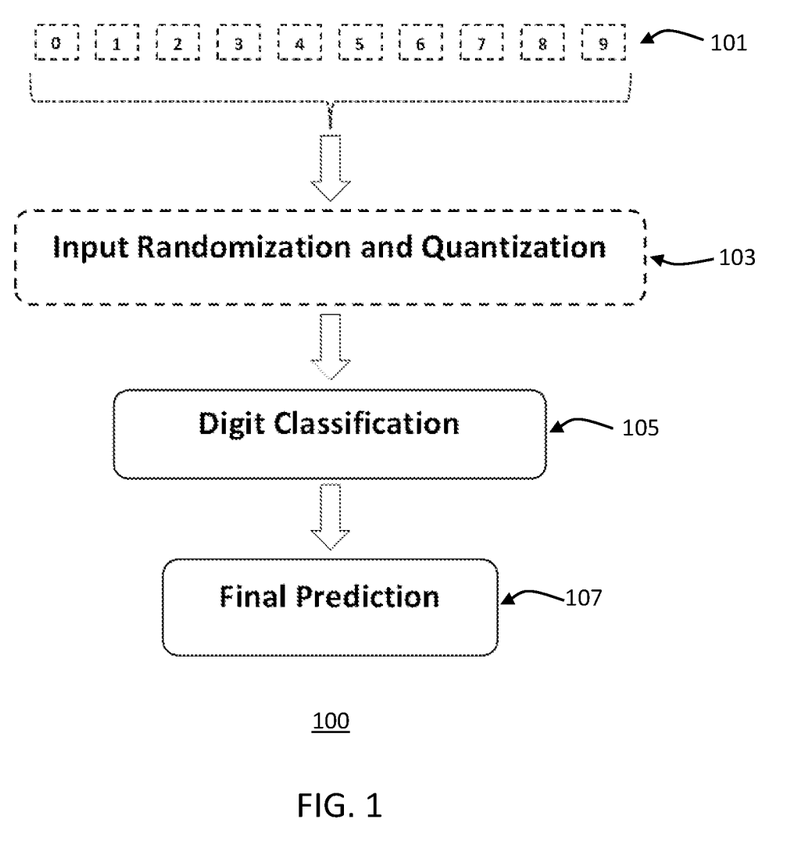
FIG. 1 illustrates a system architecture of an embodiment.

FIG. 1 illustrates a system architecture 100 according to an embodiment. In FIG. 1, the user inputs an image 101—in the example shown, the image 101 is of a digit in the range 0-9. The image 101 is then passed on to a defense layer (security mechanism) 103 that randomizes and quantizes the image pixels. Finally, the resulting image is fed to a classifier 105 (e.g., a machine learning model classifier) which outputs a prediction 107. Many deep learning based image classifiers have been found to be vulnerable to adversarial perturbations.

The following example applications—where a security mechanism of the present invention was applied to harden (protect) hand-written digit recognition—further illustrates features and advantages of various embodiments of the present invention. In the example applications, the MNIST hand-written digit dataset was used. The MNIST dataset is used in the machine learning community to benchmark and study new techniques. The dataset includes labeled images of hand-written digits from 0 to 9. The images are greyscale, where the magnitude of each pixel represents its brightness. The magnitude ranges from 0 to 255, where 0 denotes black and 255 denotes white. All the levels in between are shades of grey. Although, the example applications described used greyscale images, defenses provided by embodiments of the present invention are directly applicable to color images with minor adjustments as color images have three channels one each for red, green and blue with similar magnitude range for each channel, each of the three channels can be perturbed and quantized individually to provide similar security.

Figure 2:
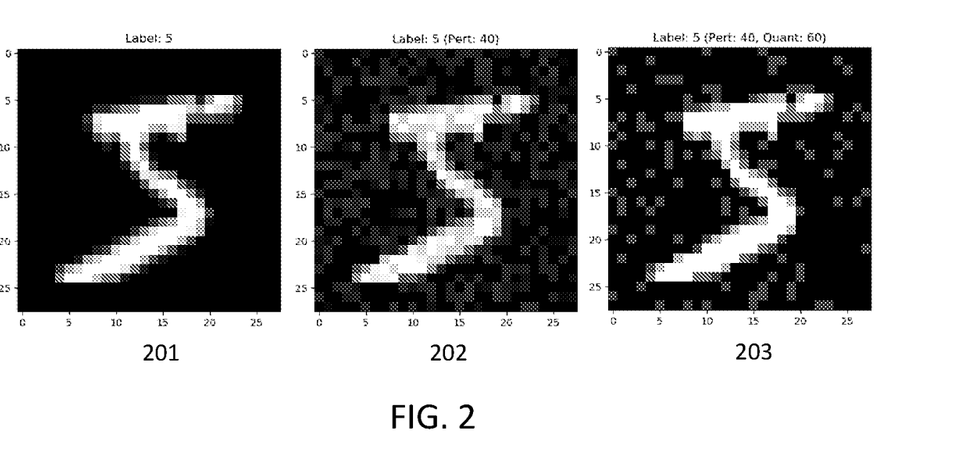
FIGS. 2 and 3 illustrate the effect of randomization and quantization on a sample image according to embodiments.
Figure 3:
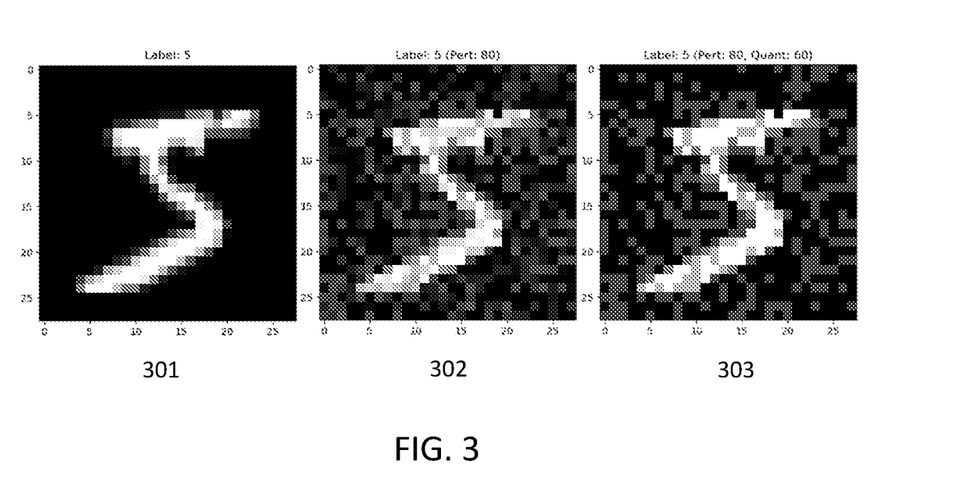

FIGS. 2 and 3 illustrate the effect of randomization and quantization on a sample image according to embodiments. The choice of randomness and quantization levels is important because it affects the accuracy of the machine learning model as well as the resistance to adversarial attacks. For example, adding too much randomness can reduce the classification task to random guessing.

In each of FIGS. 2 and 3, (from left to right) the original image (201, 301) is followed by one that has perturbation introduced (202, 302), and the final image additionally includes quantization (203, 303). The images do not have any perturbation introduced by an adversary. Manipulating pixels through randomization and quantization also randomizes the changes introduced by the adversary and bounds it to a specific quantization level. In the example applications, perturbation magnitudes were chosen up to 120 with quantization levels varying from 25 to 150 in steps of 25. FIG. 2 illustrates an effect of perturbation level 40 (image 202) and quantization level 60 (image 203) as compared to the original image 201. FIG. 3 illustrates an effect of perturbation level 80 (image 302) and quantization level 60 (image 303) as compared to the original image 301.

In the example applications, defensive mechanisms according to embodiments of the invention were applied to the MNIST dataset. With the defensive mechanisms in place, the machine leaning models were effective against the current state-of-the-art attacks. The accuracy of the model was also good, and even for the highest level of perturbation (i.e., 120) the accuracy only decreases from 99.69% to just over 98%. The defense works because the perturbations introduced by the adversary are very specific and are sensitive to change; therefore, they fail to have an impact in the presence of perturbations that cannot be predicted. This also prevents the adversary from adaptively choosing perturbations that work during classification because a new set of perturbations are chosen afresh by the defense layer, which the adversary can neither predict nor manipulate.

Techniques of the present invention are applicable for securing machine learning systems dealing with images and videos, for example in a machine learning system where self-driving cars need to interpret road signs, or where drones needing to interpret their surroundings. The defensive mechanism of embodiments can also be applied to harden malware classification and intrusion detection systems. The defensive mechanism of embodiments is applicable to most other areas or machine learning, as they can be tweaked to randomize and quantize features of the data based on the type of data at hand.

Embodiments of the present invention provide methods for hardening machine learning systems against adversarial attacks through input randomization and quantization (i.e., a defensive mechanism employed to protect machine learning models). For example, a hardening operation can introduce random perturbations followed by quantizing to a machine learning model input before the input is passed to a prediction step (e.g., a machine learning classification step). This hardening operation makes the results of perturbations introduced by an adversary unpredictable, thus defeating their attacks.

In some embodiments, the methods are applied to systems for hand-written digit recognition. A machine hardening method, according to embodiments, includes taking an image (e.g., an image of a digit) submitted for classification, which may have been maliciously modified. Then, a perturbation is picked from a predefined discrete uniform distribution at random for each pixel value. The perturbation is added to individual pixels, and values are clipped if they go above 255 or below 0. The individual pixel values are then quantized using the predefined quantization threshold; thus, computing the final pixel values. Then, the modified image is passed to a classifier for classification.

Figure 4:
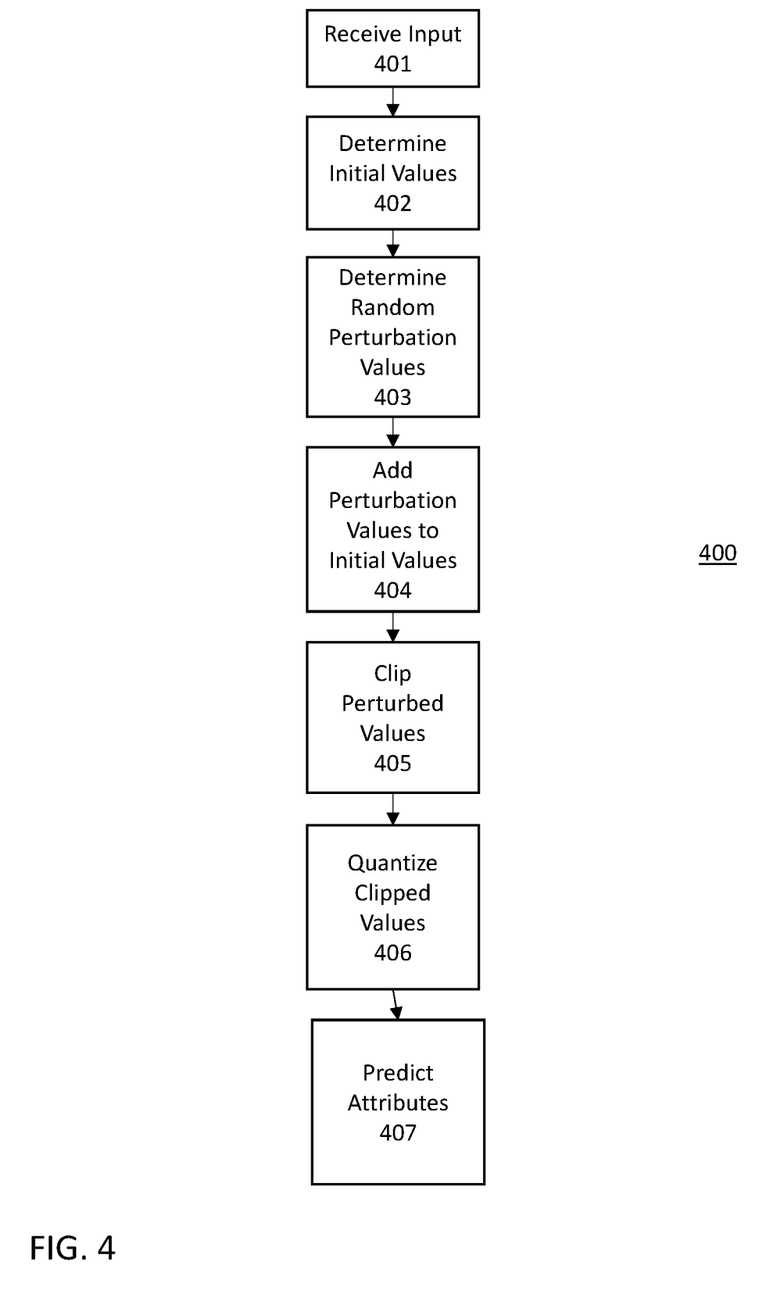
FIG. 4 illustrates a method of performing a hardened machine learning operation according to an embodiment.

FIG. 4 illustrates a hardening method 400 according to an embodiment. First, an input is received (Operation 401). The input can be any input for a machine learning model; for example an image (e.g., handwritten digits) or a video (e.g., video image for self-driving car). Initial values of features of the input are then determined (Operation 402). For example, if the input is an image, the initial values may be pixel values (e.g., [0,255] for a grey scale image). The hardening method 400 also determines perturbation values (Operation 403). These perturbation values may be chosen uniformly at random. The perturbation values are then added to the initial values (Operation 404). In embodiments, the resulting perturbed input values are clipped (Operation 405). For example, in a system where the input is a gray scale image, the resulting values may be clipped so not to go outside the range [0, 255]. In some embodiments, the clipping operation (Operation 405) is omitted. The perturbed and clipped (or simply perturbed) input values are then quantized (Operation 406). The quantized values are then analyzed by a machine learning model to predict attributes of the input (Operation 407). In embodiments, the machine learning model is a classifier.

In some embodiments, a security mechanism (e.g., a security application running on a processor) is provided for inclusion in a machine learning model to defend against attacks from adversaries. The security mechanism is configured to receive a machine learning input having a plurality of features (e.g., an image having a plurality of pixels), and then choose (or otherwise cause to be selected) a perturbation modifier, the value of the perturbation modifier may be chosen uniformly at random from a discrete distribution. The security mechanism may make such a selection based on a key for each input feature (e.g., each image pixel). The security mechanism then adds the perturbation modifier chosen for each input feature (e.g., each image pixel) to the original value of each input feature (e.g., the 0-255 value of the pixel when first received). The security mechanism then checks the resulting value for each modified input feature (e.g., each pixel value modified with the perturbation modifier) and then clips any value which is outside a predetermined rage (e.g., a minimum and maximum value, which in particular for a pixel may be 0 and 255, respectively). The security mechanism then quantizes the perturbed and clipped values using a pre-chosen quantization threshold; thus, shrinking the attack surface. The final values (i.e., perturbed, clipped, and quantized) are then sent to the machine learning model for processing (e.g., to a classifier for classifying/predicting).

Figure 5:
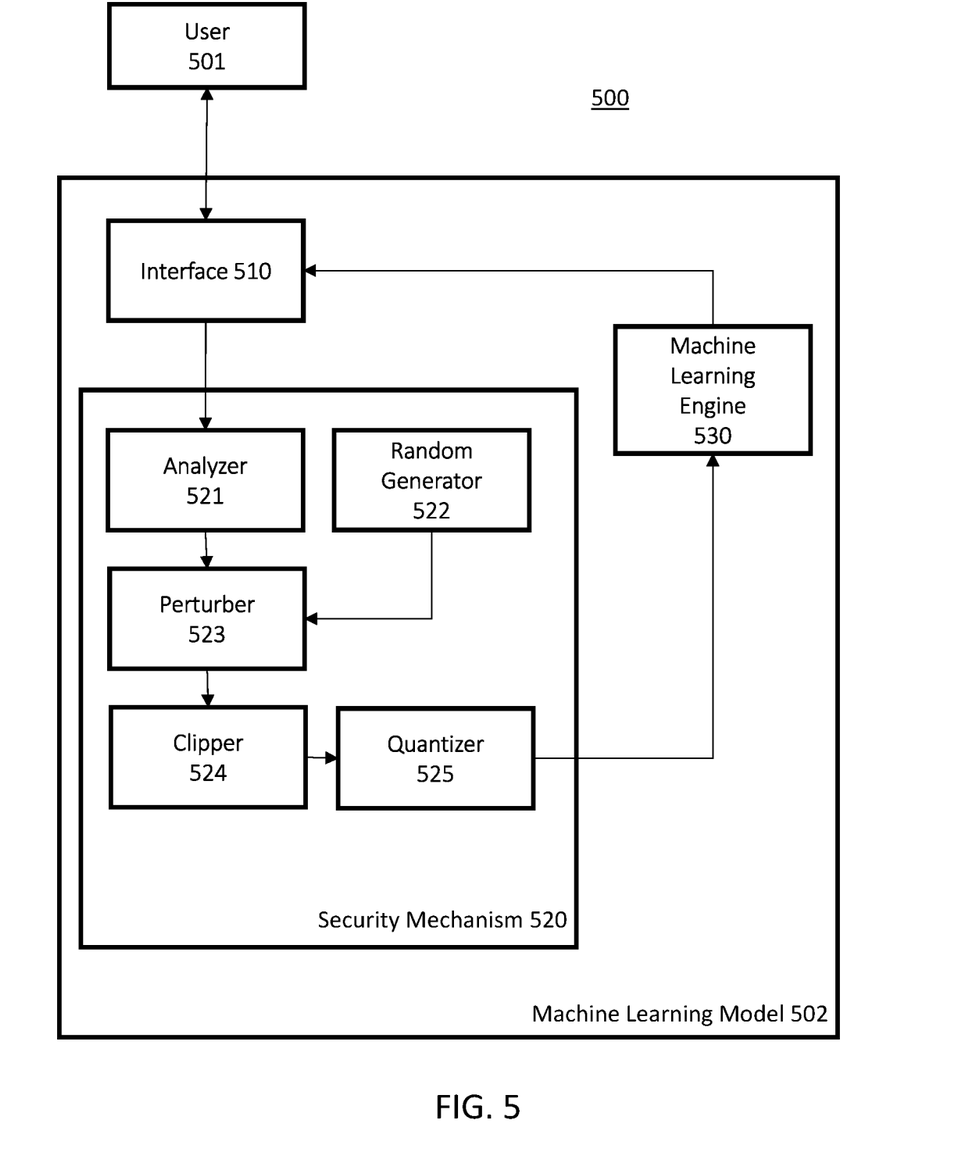
FIG. 5 illustrates a system for performing hardened machine learning according to an embodiment.

FIG. 5 illustrates a hardened machine learning system 500 according to an embodiment. The hardened machine learning system includes a user 501 sending an input for machine learning processing by a machine learning model 502. The machine learning model 502 includes an interface 510, a security mechanism 520, and a machine learning engine 530. The machine learning model 502 may be implemented on a computer, e.g., a server operating (e.g., distributively operating) on a network. The interface 510 can control/facilitate communication between the user 501 and the machine learning model 502. In operation, the user sends an input for processing by the machine learning model 502. The input can be for example a grey scale image of handwritten digits The interface 510 receives the input and sends the input to the security mechanism 520. The security mechanism 520 can include an analyzer 521, a random generator 522, a perturber 523, a clipper 524, and a quantizer 525. Each of these elements of the security mechanism 520 are configurable (e.g., programmably configurable) to adjust for a particular application (e.g., grey scale images, color images, video, etc.).

In operation, the analyzer 521 receives the input from the interface 510. The analyzer 521 determines initial values of the input (e.g., initial values for each feature of the input). The initial values are sent to the perturber 523. The perturber 523 perturbs the initial values of the input with a random perturbation value. The random perturbation value can be received from a random generator 522, generating perturbation values with a uniform at random distribution. The perturbed values can be sent to a clipper 524 which clips the perturbed values to be within an appropriate range (e.g., [0,255] for pixels of a gray scale image). The clipped values are then sent to the quantizer 525. In embodiments, the clipper 524 may not be used and instead the perturbed values are sent to the quantizer 525. The quantizer 525 then quantizes perturbed and clipped values (or the perturbed values) and outputs the resulting quantized values to the machine learning engine 530. In some embodiments, a quantizer 525 is omitted.

The machine learning model 530 receives the hardened input from the security mechanism 520 and performs a machine learning operation on it. In embodiment, the machine learning engine 530 predicts values of the user input. For example, the machine learning engine 530 may be a classifier. The predicted value can then be sent to the user 501 via the interface 510.

Embodiments of the present invention provide an improved machine learning model, which is robust against attacks from adversaries. Moreover, while state-of-the-art hardening techniques are constrained to the specific domain they were introduced in (e.g. feature squeezing in the domain of hand-written image recognition) and cannot be readily applied to other domains, the improved defense mechanisms and methods provided by embodiments of the invention can be applied across domains with minor modifications. That is, an advantage of embodiments is that they are flexible in their deployment.

Other advantages of defensive mechanisms provided by the present invention include: the application of the defensive mechanisms do not modify the underlying machine learning model; no deterministic attacks can work against the defense mechanisms; the defensive mechanisms provide an upper bound for the adversary's success; and the benefits of hardening provided by the defensive mechanism only come with a minor drop in accuracy of the model.

Figure 6:
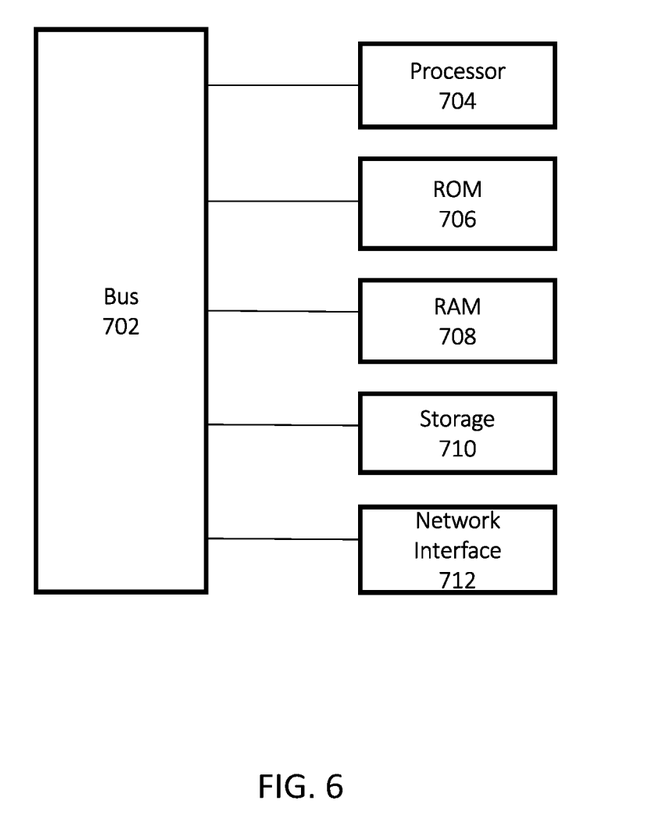
FIG. 6 illustrates a system for implementing methods and systems of embodiments.

FIG. 6 is a block diagram of a processing system according to one embodiment. The processing system can be used to implement the system and method described above. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for machine learning comprising a processor and a non-transitory memory coupled to the processor and having processor-executable instructions stored thereon, which when executed, cause the system to perform a method, the method comprising:
receiving an input having a plurality of features, the input having one or more attributes to be predicted for the system;
determining an initial value for each of the features;
determining a perturbation value for each of the features, the perturbation value being randomly selected from a distribution set;
adding the perturbation value to the initial value to determine a perturbed value for each of the features;
quantizing the perturbed value for each of the features to determine a quantized value for each of the features; and
predicting the one or more attributes of the input based on the quantized value for each of the features,
wherein quantizing the perturbed value comprises quantizing the perturbed value by using a quantization threshold to reduce the input to a smaller size in order to mitigate potential bias that is added to the input by an adversary,
wherein the quantizing the perturbed value comprises quantizing the perturbed value according to $[p/\kappa]\kappa$, where p is the perturbed value and κ is a value of a quantization level, and
wherein κ is within a range of 25 to 150.

2. The system of claim 1 wherein the distribution set has a uniform distribution.

3. The system of claim 1 wherein the method further comprises clipping the perturbed value associated with one or more features that are outside an input range to determine a revised perturbed value as the perturbed value for each of the features.

4. The system of claim 2, wherein the distribution set is a Gaussian distribution set.

5. The system of claim 2, wherein the distribution set includes values within a range defined by a maximum and minimum range of the input.

6. The system of claim 1, wherein the input is an image, and the plurality of features are a plurality of pixels.

7. The system of claim 6, wherein an initial value of each of the pixels corresponds to a grayscale value from an input range of 0 to 255.

8. The system of claim 6, wherein the perturbation value is selected uniformly at random from a discrete interval $(-\delta,+\delta)$ for each of the pixels.

9. The system of claim 6, wherein the image is of a hand-written digit in a range of 0-9, and the method further comprises predicting the digit based on the image.

10. The system of claim 1, wherein the accuracy of the prediction is greater than 98%.

11. The system of claim 1, wherein the input is a video comprising a plurality of images, each of the images comprising a plurality of pixels, wherein the plurality of features are the plurality of pixels of each of the images.

12. The system of claim 1, wherein the input is a color image comprising a plurality of red pixels, a plurality of green pixels, and a plurality of blue pixels, wherein the plurality of features are the plurality of red pixels, the plurality of green pixels, and the plurality of blue pixels.

13. The system of claim 1, wherein the system comprises a processor and a non-transitory memory coupled to the processor and having processor-executable instructions stored thereon, which when executed, cause the system to perform the method.

14. A method for a machine learning system comprising a security mechanism and a classifier, the method comprising:
receiving, by the security mechanism, an input having a plurality of features, the input having one or more attributes to be predicted for the system;
determining, by the security mechanism, an initial value for each of the features;
determining, by the security mechanism, a perturbation value for each of the features, the perturbation value being chosen at random from a distribution set by the security mechanism;
adding, by the security mechanism, the perturbation value to the initial value to determine a perturbed value for each of the features;
quantizing, by the security mechanism, the perturbed value for each of the features to determine a quantized value for each of the features;
receiving, by the classifier, the quantized value for each of the features; and
predicting, by the classifier, the one or more attributes of the input based on the quantized value for each of the features,
wherein the quantizing the perturbed value comprises quantizing the perturbed value according to $[p/\kappa]\kappa$, where p is the perturbed value and κ is a value of a quantization level,
wherein κ is within a range of 25 to 150.

15. The method of claim 14, further comprising clipping, by the security mechanism, the perturbed value associated with one or more features that are outside an input range to determine a revised perturbed value as the perturbed value for each of the features.

* * * * *